US009083095B2

(12) United States Patent
Takase et al.

(10) Patent No.: US 9,083,095 B2
(45) Date of Patent: Jul. 14, 2015

(54) WIRING MODULE

(75) Inventors: Shinichi Takase, Yokkaichi (JP); Osamu Nakayama, Yokkaichi (JP); Ryoya Okamoto, Yokkaichi (JP); Mitsutoshi Morita, Yokkaichi (JP); Kensaku Takata, Yokkaichi (JP); Hiroki Hirai, Yokkaichi (JP); Katsutoshi Saijo, Yokkaichi (JP); Hiroomi Hiramitsu, Yokkaichi (JP); Takeshi Aizawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 78 days.

(21) Appl. No.: 13/978,070

(22) PCT Filed: Feb. 21, 2012

(86) PCT No.: PCT/JP2012/054073
§ 371 (c)(1),
(2), (4) Date: Jul. 2, 2013

(87) PCT Pub. No.: WO2012/127962
PCT Pub. Date: Sep. 27, 2012

(65) Prior Publication Data
US 2013/0280959 A1    Oct. 24, 2013

(30) Foreign Application Priority Data

Mar. 18, 2011   (JP) ................. 2011-061006

(51) Int. Cl.
*H01M 2/20*   (2006.01)
*H01M 2/10*   (2006.01)
(Continued)

(52) U.S. Cl.
CPC ............ *H01R 11/12* (2013.01); *H01M 2/1077* (2013.01); *H01M 2/206* (2013.01); *H02B 1/21* (2013.01)

(58) Field of Classification Search
CPC ..... H01M 11/12; H01M 2/206; H01M 2/202; H01M 2/204; H01M 2/0242; H01M 10/482; H01M 2/1077; H01M 2/305; H01M 2/0404; H01R 13/5214
USPC ......... 439/76.2, 212, 213, 871, 873, 625–757
See application file for complete search history.

(56) References Cited

U.S. PATENT DOCUMENTS 5,865,638 A * 2/1999 Trafton .................. 439/288
7,556,533 B2 * 7/2009 Seo ....................... 439/627
(Continued)

FOREIGN PATENT DOCUMENTS

EP    2544262    1/2013
JP    11-067184   3/1999
(Continued)

OTHER PUBLICATIONS

Takase, Battery Connection Assembly JP 2011091003.*
(Continued)

*Primary Examiner* — James Harvey
*Assistant Examiner* — Matthew T Dzierzynski
(74) *Attorney, Agent, or Firm* — Greenblum & Bernstein, P.L.C.

(57) ABSTRACT

A wiring module attached to a plurality of electric cells having electrode terminals including positive electrodes and negative electrodes has a plurality of bus bars having pairs of through-holes respectively connected to the positive electrodes and the negative electrodes of the electric cells and bus bar insulating members each held by the adjacent bus bars. Of the plurality of bus bar insulating members, a first bus bar insulating member and a second bus bar insulating member are connected with each other by the bus bar.

18 Claims, 23 Drawing Sheets

(51) Int. Cl.
*H01M 2/30* (2006.01)
*H01R 11/12* (2006.01)
*H02B 1/21* (2006.01)

(56) References Cited

U.S. PATENT DOCUMENTS

| | | | |
|---|---|---|---|
| 8,388,382 B2* | 3/2013 | Ikeda et al. | 439/627 |
| 8,545,271 B2* | 10/2013 | Henmi | 439/627 |
| 8,623,540 B2* | 1/2014 | Kim | 429/158 |
| 2013/0161053 A1* | 6/2013 | Okamoto et al. | 174/68.1 |

FOREIGN PATENT DOCUMENTS

| | | |
|---|---|---|
| JP | 2010-225449 | 10/2010 |
| JP | 2011-091003 | 5/2011 |
| WO | 2011/108513 | 9/2011 |

OTHER PUBLICATIONS

Takase, Connecting Unit JP 2010225449.*
International Search Report, mail date is May 29, 2012.

* cited by examiner

WIRING MODULE

TECHNICAL FIELD

The present invention relates to a wiring module.

BACKGROUND ART

In a battery module for electric automobiles or hybrid automobiles, a plurality of electric cells having positive electrodes and negative electrodes are disposed in alignment. The positive electrodes and the negative electrodes are connected by connection members (bus bars), and thus the plurality of electric cells are electrically connected (refer to Patent Literature 1).

CITATION LIST

Patent Literature

Patent Literature 1: Japanese Patent Laid-Open Publication No. H11-067184

SUMMARY OF INVENTION

Technical Problem

In the configuration above, however, it is necessary to connect the positive electrodes to the negative electrodes using the connection members in a plurality of locations. Thus, cumbersome work is required to repeatedly connect the terminals using the connection members.

A battery connection plate (wiring module) is then considered for inclusion, in which a plurality of connection members disposed in a mold are integrally formed in a resin by insertion molding, depending on the number of locations where positive electrodes and negative electrodes are connected.

Thus, simply attaching one battery connection plate to a plurality of positive electrodes and negative electrodes that project from a plurality of electric cells collectively connects the positive electrodes and negative electrodes in a plurality of locations, thus improving workability.

However, when a battery connection plate integrally formed of a plurality of connection members is used, a mold to form the battery connection plate increases in size in accordance with an increase in the number of electric cells, thus leading to an increase in cost for the mold. Furthermore, when the number of electric cells is changed, it is necessary to separately prepare a new mold having a length corresponding to the number of electric cells and to form a battery connection plate having a different length, thus resulting in an increase in cost, including the cost of mold fabrication. Under such circumstances, a reduction in production cost is targeted.

In view of the circumstances above, the present invention is perfected to provide a wiring module that reduces production cost and simplifies attachment of a plurality of bus bars.

Solution to Problem

An aspect of the present invention provides a wiring module attached to a plurality of electric cells having electrode terminals including positive electrodes and negative electrodes. The wiring module has a plurality of bus bars having pairs of connection portions respectively connected to the positive electrodes and the negative electrodes of the electric cells, and bus bar insulating members each held by the adjacent bus bars. Of the plurality of bus bar insulating members, a first bus bar insulating member and a second bus bar insulating member are connected with each other by the bus bar.

According to the present invention, the bus bars and the bus bar insulating members connected with each other by the bus bars are simply attached to the electric cells to connect the electrode terminals in a plurality of locations. This simplifies attachment work to connect the electrode terminals.

When the number of connected electric cells is changed, the number of the bus bars and the number of the bus bar insulating members can be changed to match. Thus, a mold to form one bus bar insulating member is prepared and a plurality of bus bar insulating members are formed. A required number of bus bar insulating members can then be connected by the bus bars so as to match the change in the number of the connected electric cells. Accordingly, unlike a case where an integrated battery connection plate is produced, it is unnecessary to increase the size of a mold due to an increase in the number of the connected electric cells, or to prepare a separate mold to form a battery connection plate whenever the number of the connected electric cells changes. Thus, production cost can be reduced.

Aspects below are preferred as embodiments of the present invention.

Preferably, at least one of the first bus bar insulating member and the second bus bar insulating member is movably connected to the bus bar.

According to the aspect above, production tolerances among the electrode terminals of the plurality of electric cells and assembly tolerances can be met due to relative movement of the bus bars and the bus bar insulating members.

Preferably, the first bus bar insulating member is fixated and held by the bus bar and the second bus bar insulating member is movably held by the bus bar.

Preferably, the bus bar insulating member is held by the bus bar with a clearance.

According to the aspect above, a simple method of providing the clearance between the bus bar and the bus bar insulating member allows production tolerances among the electrode terminals of the plurality of electric cells and assembly tolerances to be met.

Preferably, the bus bar insulating member includes a placement portion on which the bus bar is placed; and an engagement tab holding and locking the bus bar in a thickness direction of the bus bar.

According to the aspect above, the bus bar is held by the bus bar insulating member in a simple configuration in which the bus bar is held and locked between the placement portion and the engagement tab.

Preferably, a clearance in the thickness direction of the bus bar is provided between the bus bar placed on the placement portion and one of the placement portion and the engagement tab.

According to the aspect above, tolerances among the electrode terminals of the plurality of electric cells are met in the thickness direction of the bus bar.

Preferably, the bus bar insulating members has a plurality of engagement tabs aligned in a direction in which the bus bar insulating members are connected.

When the plurality of bus bars and the plurality of bus bar insulating members are connected, relatively large forces are applied to the engagement tabs due to weights of the bus bars and the bus bar insulating members. This may lead to defects, such as deformation of the engagement tabs. In the aspect above, the bus bar insulating member has the plurality of engagement tabs aligned in the direction in which the bus bar insulating members are connected, and thus the force exerted on each of the engagement tabs is distributed. This inhibits defects stemming from the relatively large forces applied to the engagement tabs.

Preferably, a recess in a surface of the bus bar is engaged with a projection in the bus bar insulating member, or a projection in the surface of the bus bar is engaged with a recess in the bus bar insulating member.

According to the aspect above, the bus bar and the bus bar insulating member can be connected with each other in a simple configuration in which the recess and the projection are engaged.

Preferably, the recess and the projection are engaged with a clearance therebetween.

According to the aspect above, production intersections among the electrode terminals of the plurality of electric cells and assembly tolerances can be met in a direction parallel to a plate surface of the bus bar.

Preferably, the recess in the bus bar is provided spanning a portion where the first bus bar insulating member and the second bus bar insulating member are connected and the projection is provided in a portion opposite to the recess in the first bus bar insulating member and the second bus bar insulating member; alternatively, the projection in the bus bar is provided spanning a portion where the first bus bar insulating member and the second bus bar insulating member are connected and the recess is provided in a portion opposite to the recess in the first bus bar insulating member and the second bus bar insulating member.

According to the aspect above, a structure of the bus bar can be simplified, as compared with a case where a recess is provided corresponding to each of the first bus bar insulating member and the second bus bar insulating member.

Preferably, engagement between the recess and the projection prevents disengagement of the bus bar and the first bus bar insulating member and disengagement of the bus bar and the second bus bar insulating member.

According to the aspect above, a structure of the bus bar and the bus bar insulating member can be simplified, as compared with a case where a structure is separately provided to prevent disengagement of the bus bar and the bus bar insulating member.

Preferably, the connection portions are provided passing through the bus bar and are through-holes into which the positive electrode and the negative electrode are respectively inserted.

According to the aspect above, the bus bar and the electrode terminal having the positive electrode and the negative electrode are connected in a simple structure in which the positive electrode and the negative electrode are inserted in the through-holes in the bus bar.

Preferably, at least one of the pair of connection portions is an elongated hole having a long diameter in the direction in which the bus bar insulating members are connected.

According to the aspect above, a production tolerance and an assembly tolerance between the positive electrode and the negative electrode of adjacent electric cells can be met by the elongated hole.

Preferably, the bus bar insulating member has an insulating wall separating the adjacent bus bars.

According to the aspect above, insulation can be ensured between the adjacent bus bars.

Preferably, the first bus bar insulating member has a guide extending toward the second bus bar insulating member and the second bus bar insulating member has a guide receiver receiving the guide.

According to the aspect above, the guide is received by the guide receiver, thus improving workability of assembling the first bus bar insulating member and the second bus bar insulating member.

Furthermore, since the guide is received by the guide receiver, displacement of the first bus bar insulating member and the second bus bar insulating member can be inhibited in the direction intersecting the direction in which the guide extends. This improves the strength of the wiring module as a whole.

Preferably, of the plurality of bus bars, the bus bar positioned in an end portion has an auxiliary insulating member composed of a synthetic resin on an end portion opposite to an end portion where the bus bar insulating member is held.

According to the aspect above, the bus bar positioned in the end portion of the wiring module can be electrically insulated.

Preferably, one of the pair of connection portions is connected to a voltage detection terminal detecting a voltage of the electric cell.

According to the aspect above, the voltage of the electric cell can be detected.

Preferably, the bus bar insulating member has a holder holding the voltage detection terminal.

According to the aspect above, the voltage detection terminal can be held by the bus bar insulating member.

Preferably, one of the bus bar and the voltage detection terminal has an engagement portion engaging with the other.

The bus bar and the voltage detection terminal are connected to the electrode terminal of the electric cell. In this state, when the bus bar and the voltage detection terminal are independently movable, there may be a case where the voltage detection terminal is not accommodated in a proper position even when the bus bar is accommodated in a proper position. It is then necessary to position the bus bar and the electrode terminal in proper positions and to position the voltage detection terminal and the electrode terminal as separate tasks. This decreases workability in connecting the bus bar and the voltage detection terminal to the electrode terminal. In the aspect above, the bus bar and the voltage detection terminal are engaged with each other by the engagement portion, thus preventing the bus bar and the voltage detection terminal from moving independently. This improves workability in connecting the bus bar and the voltage detection terminal to the electrode terminal.

Advantageous Effects of Invention

The present invention reduces production cost of a wiring module and simplifies attachment of a plurality of bus bars.

DESCRIPTION OF EMBODIMENTS

First Embodiment

Figure 1:
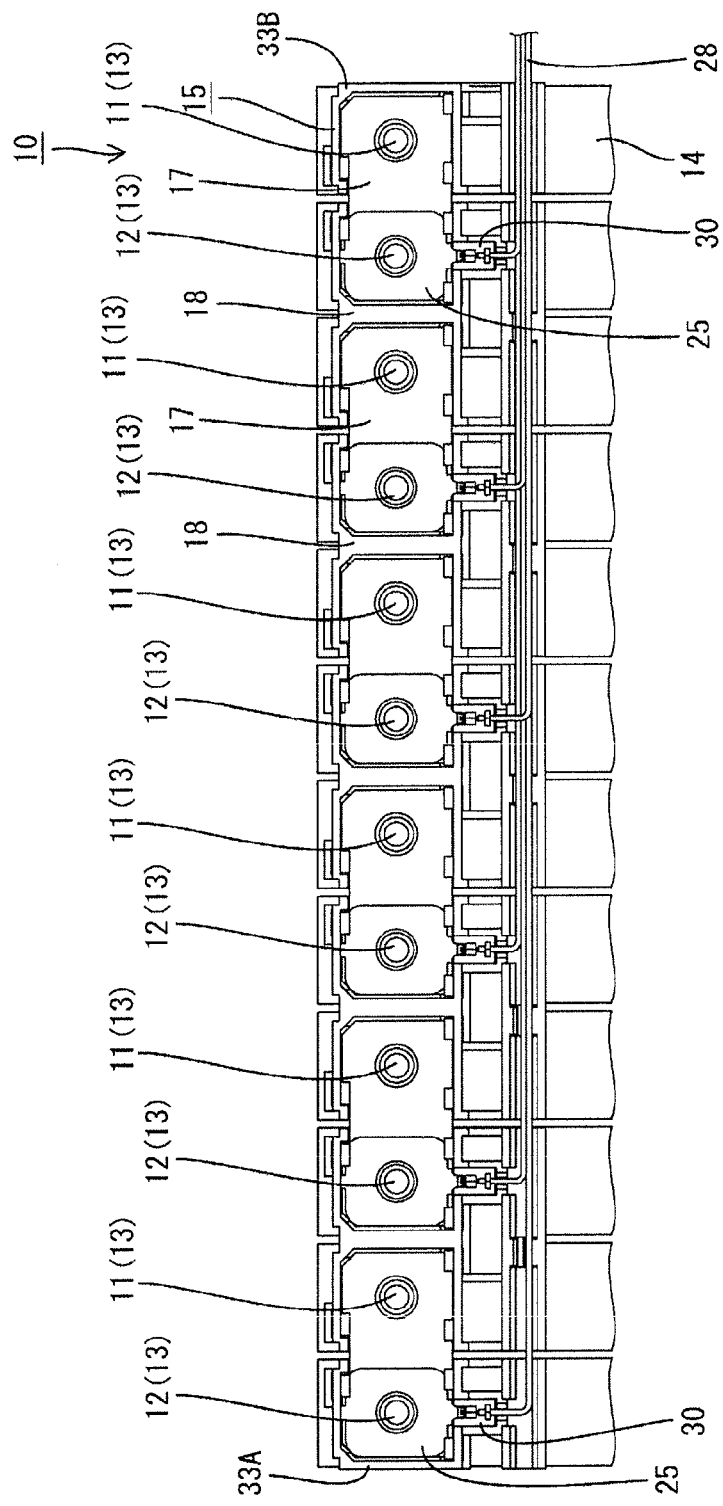
FIG. 1 is a plan view of a battery module according to a first embodiment of the present invention.
Figure 2:
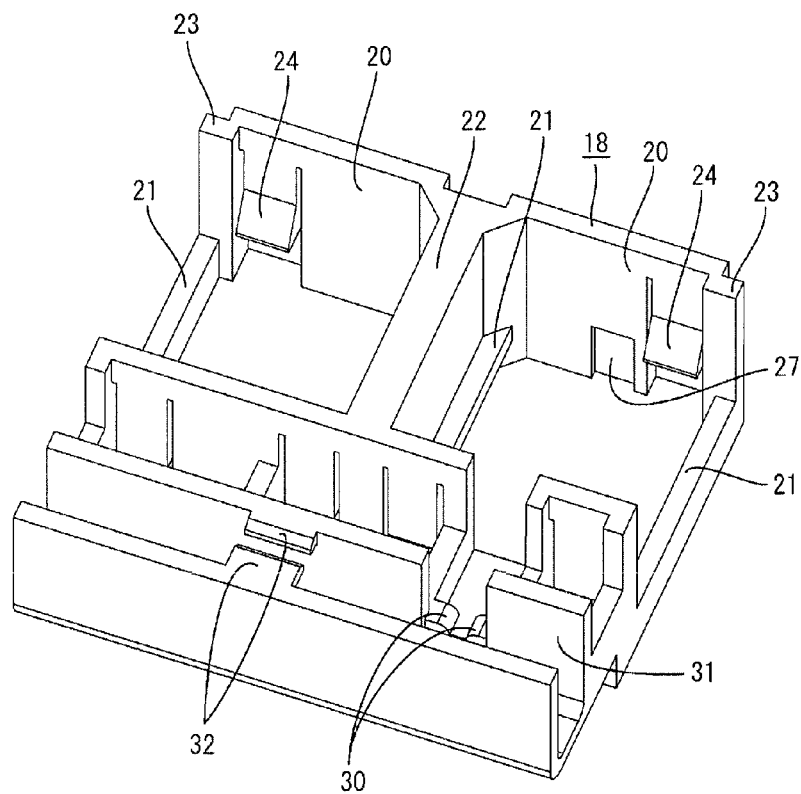
FIG. 2 is a perspective view of a bus bar insulating member.
Figure 3:
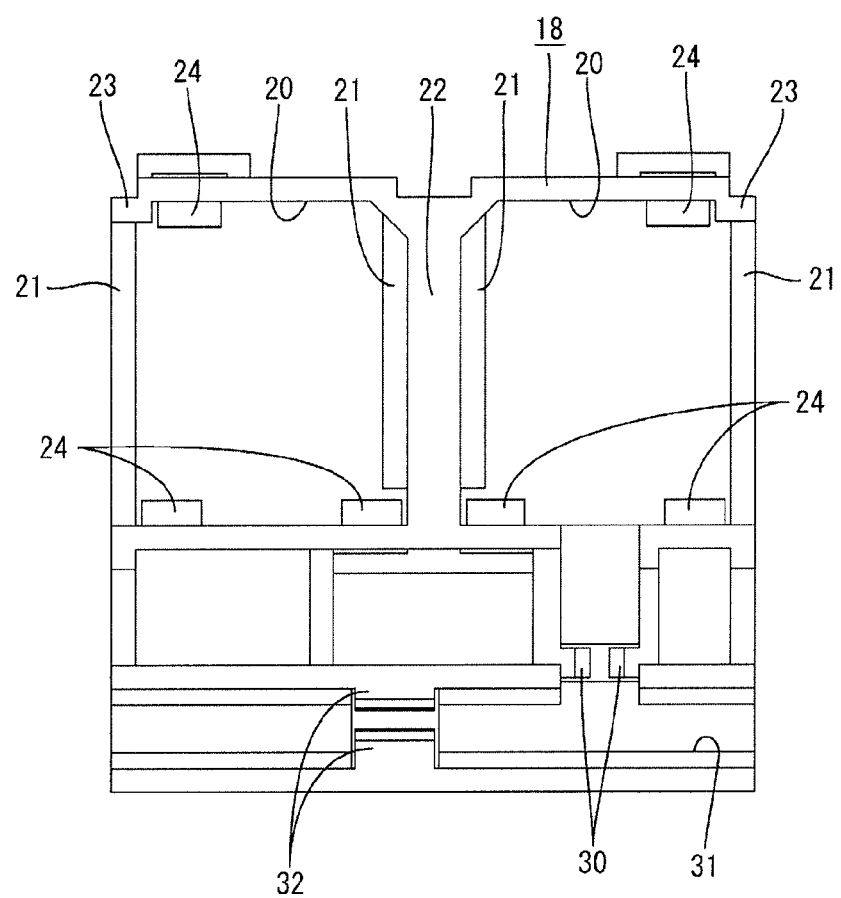
FIG. 3 is a plan view of the bus bar insulating member.
Figure 4:
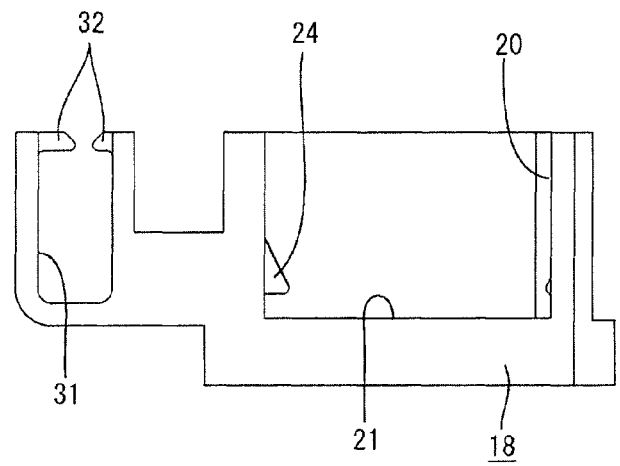
FIG. 4 is a side view of the bus bar insulating member.
Figure 5:
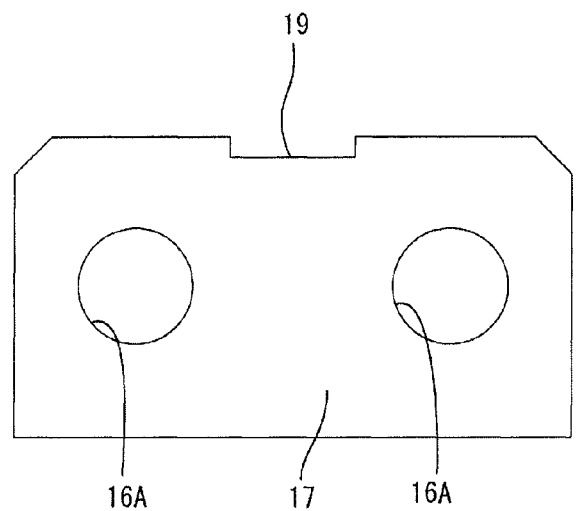
FIG. 5 is a plan view of a bus bar.
Figure 6:
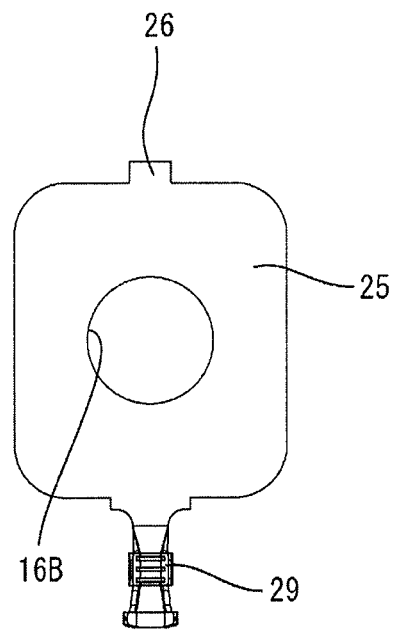
FIG. 6 is a plan view of a voltage detection terminal.
Figure 7:
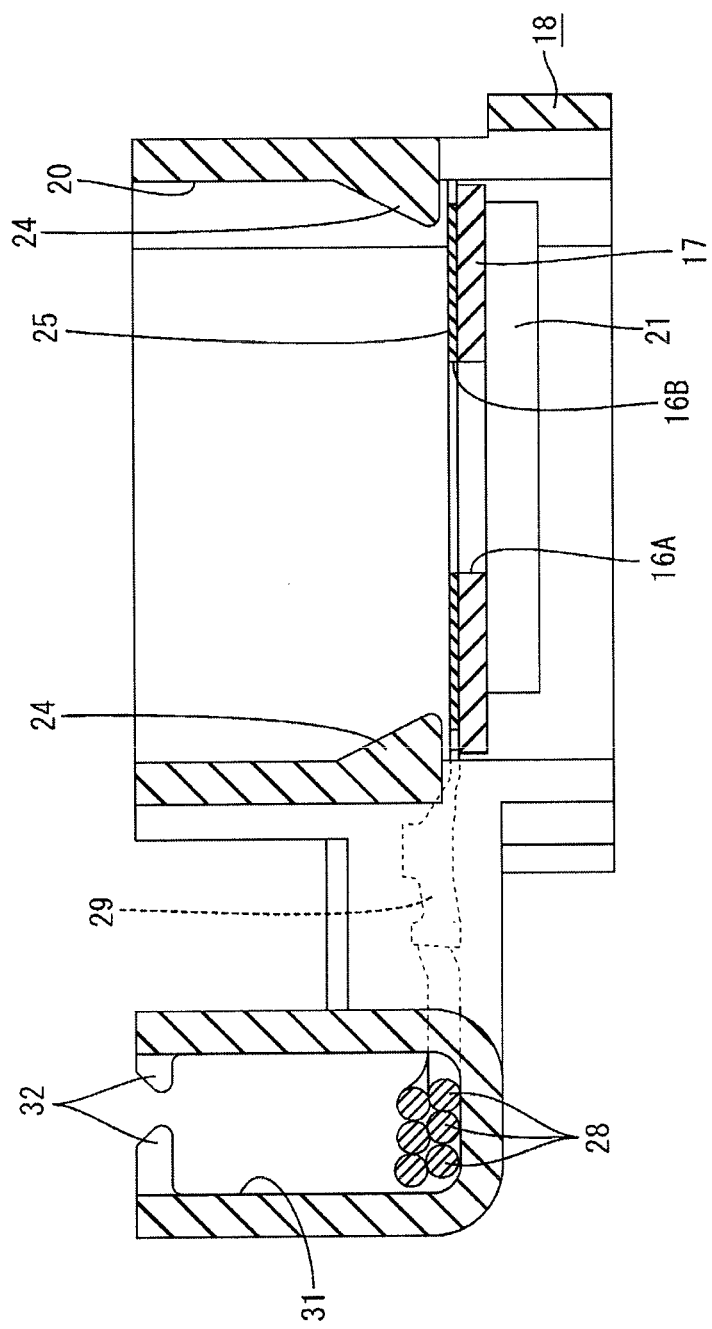
FIG. 7 is a cross-sectional view illustrating a state where the voltage detection terminal is accommodated in a housing.

With reference to FIGS. 1 to 14, a first embodiment is described in which a wiring module 15 according to the present invention is applied to a battery module 10. The battery module 10 according to the present embodiment has a plurality of electric cells 14 having electrode terminals 13 that include positive electrodes 11 and negative electrodes 12. The battery module 10 is used as a drive source for a vehicle (not shown in the drawings), such as, for example, an electric automobile or a hybrid automobile. The positive electrode 11 and the negative electrode 12 of different electric cells 14 are electrically connected by the wiring module 15, and thus the plurality of electric cells 14 are connected in series. In the description below, left in FIG. 1 is defined as left and right as right. Upward in FIG. 7 is defined as upward and downward as downward.

(Electric Cell 14)

The electric cell 14 has a flat rectangular parallelepiped shape. On an upper surface of the electric cell 14, the electrode terminal 13 is provided, which includes the positive electrode 11 and the negative electrode 12 in respective locations close to two end portions in a long diameter direction. The electrode terminal 13 has electrode posts each having a round bar shape and projecting upward from a base composed of a metal plate. A thread is provided in a surface of the electrode post (not shown in detail in the drawings). The electric cells 14 are disposed such that the positive electrodes 11 and the negative electrodes 12 are provided adjacently in a short diameter direction.

(Wiring Module 15)

The wiring module 15 has a plurality of bus bars 17 and bus bar insulating members 18, the bus bars 17 each having a pair of through-holes 16A (connection portions) through which the positive electrode 11 and the negative electrode 12 of the electric cell 14 are respectively inserted to be connected, the bus bar insulating members 18 each being composed of a synthetic resin and being held by adjacent bus bars 17. In the present embodiment, the bus bar insulating members 18 are connected in a left-right direction.

(Bus Bar 17)

The bus bar 17 is formed by pressing a plate material composed of a metal, such as copper, copper alloy, stainless steel, or aluminum, into a predetermined shape. In the present embodiment, the bus bar 17 has substantially a rectangular shape. The bus bar 17 may be plated on a surface with a metal, such as tin or nickel.

The bus bar 17 has the pair of through-holes 16A with a predetermined distance therebetween. The positive electrode 11 and the negative electrode 12 of the electric cell 14 are inserted through the respective through-holes 16A. The through-holes 16A in the present embodiment have a circular shape as viewed from above. The pair of through-holes 16A are provided with a predetermined distance therebetween. In the present embodiment, the predetermined distance above is defined as a pitch between the adjacent positive electrode 11 and negative electrode 12. An inner diameter of the through-hole 16A is defined so as to be the same as or slightly greater than an outer diameter of the positive electrode 11 or the negative electrode 12 to which a tolerance for the pitch between the adjacent positive electrode 11 and negative electrode 12 is added. Furthermore, the bus bar 17 has a recess 19 on one of a pair of long sides. The recess 19 is provided within the surface of the bus bar 17 and is provided symmetrically in the left-right direction in substantially a central position in the left-right direction of the bus bar 17.

(Bus Bar Insulating Member 18)

The bus bar insulating member 18 is held between adjacent bus bars 17. A first bus bar insulating member 18 and a second bus bar insulating member 18 included in the plurality of bus bar insulating members 18 are mutually connected by the bus bar 17.

The bus bar insulating member 18 has two housings 20 that open upward and accommodate the bus bars 17. The housing 20 is formed into a size that approximately accommodates substantially half of the bus bar 17. A bottom portion of the housing 20 opens downward except a placement portion 21 on which the bus bar 17 is placed. The placement portion 21 is provided in positions close to left and right end portions of each housing 20 and extends in a direction intersecting the left-right direction. Furthermore, an insulating wall 22 stands upward between the two housings 20 and partitions the adjacent bus bars 17. Heights of a side wall of the housing 20 and the insulating wall 22 are defined higher than upper end portions of the positive electrode 11 and the negative electrode 12 in a state where the wiring module 15 is connected to the electric cell 14. This inhibits the positive electrode 11 and the negative electrode 12 from being brought into contact with and then short-circuited by a tool. In the present embodiment, the height of the side wall of the housing 20 and that of the insulating wall 22 are defined to be the same, but may differ whenever necessary.

The housing 20 has a projection 23 projecting toward an interior of the housing 20. The projection 23 is provided in a position opposite to the recess 19 of the bus bar 17 in a state where the bus bar 17 is accommodated in the housing 20. In the state where the bus bar 17 is accommodated in the housing 20, the projection 23 is positioned inside the recess 19.

A predetermined clearance is provided between the projection 23 of the bus bar insulating member 18 positioned in the recess 19 of the bus bar 17 and a side end of the recess 19. In the present embodiment, a clearance is provided between the projection 23 and the side end of the recess 19 in a direction in which the bus bar insulating members 18 are connected. The clearance may be provided in a direction intersecting the direction in which the bus bar insulating members 18 are connected. The clearance allows the bus bar 17 and the bus bar insulating member 18 to move relative to each other.

The side wall of the housing 20 has an engagement tab 24 projecting toward an interior of the housing 20. The engagement tab 24 is elastically deformable in a thickness direction of the side wall of the housing 20. When the bus bar 17 is inserted from above (thickness direction of the bus bar 17) into the housing 20, the bus bar 17 is brought into contact with the engagement tab 24 from above and then the engagement tab 24 elastically deforms outward in the thickness direction of the side wall of the housing 20. When the bus bar 17 is further pressed downward, the bus bar 17 proceeds further than the engagement tab 24 and then the engagement tab 24 is restored from deformation. Thus, the bus bar 17 is held in the housing 20 from above (thickness direction of the bus bar 17) by the engagement tab 24. In other words, the bus bar 17 is interposed and locked between an upper surface of the placement portion 21 and a lower surface of the engagement tab 24.

A predetermined clearance is provided between the bus bar 17 and the upper surface of the placement portion 21 or the lower surface of the engagement tab 24. In other words, a predetermined clearance is provided between the upper surface of the placement portion 21 and the lower surface of the engagement tab 24, and the bus bar 17 is disposed in the clearance between the upper surface of the placement portion 21 and the lower surface of the engagement tab 24. The clearance is defined so as to correspond to a tolerance for vertical height positions of the positive electrode 11 and the negative electrode 12 of different electric cells 14. The clearance allows the bus bar 17 and the bus bar insulating member 18 to move relative to each other.

(Voltage Detection Terminal 25)

Of the two housings 20 of the bus bar insulating member 18, one housing 20 has a voltage detection terminal 25 placed on the bus bar 17 to detect a voltage of the electric cell 14. In the present embodiment, the voltage detection terminal 25 is accommodated in the housing 20 on the right-hand side of one bus bar insulating member 18 in FIG. 1. The voltage detection terminal 25 is provided by pressing a plate material composed of a metal, such as copper, copper alloy, stainless steel, or aluminum, into a predetermined shape. The voltage detection terminal 25 may be plated on a surface with a metal, such as tin or nickel.

In the present embodiment, the voltage detection terminal 25 has substantially a rectangular shape and has a through-hole 16B proximate to the center through which the positive electrode 11 or the negative electrode 12 is inserted. The voltage detection terminal 25 has an engagement projection 26 projecting upward in FIG. 6. The side wall of the housing 20 has an engagement recess 27 in a position corresponding to the engagement projection 26 such that the engagement projection 26 engages therewith in a state where the voltage detection terminal 25 is accommodated in the housing 20. The engagement of the engagement projection 26 and the engagement recess 27 regulates the voltage detection terminal 25 from rotating in the housing 20.

With reference to FIG. 7, a clearance is also provided between an upper surface of the voltage detection terminal 25, which is placed on the bus bar 17, and the engagement tab 24. This allows the voltage detection terminal 25 and the bus bar insulating member 18 to move relative to each other.

The voltage detection terminal 25 has a barrel 29 in an end portion opposite to the engagement projection 26. The barrel 29 projects downward in FIG. 6 and connects to an end portion of a wire 28. The barrel 29 is wound and clamped around the wire 28, and thus the voltage detection terminal 25 and the wire 28 are electrically connected. The wire 28 is connected to an ECU or the like (not shown in the drawing). The ECU detects a voltage of the electric cell 14.

The bus bar insulating member 18 has a holder 30 projecting from the housing 20 and holding the barrel 29 of the voltage detection terminal 25. The holder 30 is slightly narrower than a width of the barrel 29 and is elastically deformable. The barrel 29 of the voltage detection terminal 25 is brought into contact with the holder 30 from above, and then the holder 30 is widened and deformed to pinch and hold the barrel 29 of the voltage detection terminal 25.

A wire housing groove 31 is provided at a front end of the holder 30. The wire housing groove 31 extends in a direction orthogonal to a direction in which the holder 30 extends and the wire 28 is accommodated therein. Side walls of the wire housing groove 31 have a pair of holding tabs 32 positioned in an upper portion of the wire housing groove 31 and holding the wire 28 from above. A distance between the pair of holding tabs 32 is greater than an outer diameter of one wire 28 and less than a width of the wire housing groove 31.

The bus bar 17 and the positive electrode 11 or the negative electrode 12 are screwed by a nut (not shown in the drawing) screwed to the positive electrode 11 or the negative electrode 12. The bus bar 17 and the voltage detection terminal 25 are fastened together by the nut in a stacked state and thus are connected to the positive electrode 11 or the negative electrode 12.

(Auxiliary Insulating Member 33A, 33B)

In the wiring module 15, auxiliary insulating members 33A and 33B composed of a synthetic resin are held on end portions of the bus bars 17 positioned on left and right end portions, respectively, in FIG. 1. The auxiliary insulating members 33A and 33B each have substantially a shape in which the bus bar insulating member 18 is bisected along the insulating wall 22.

Figure 8:
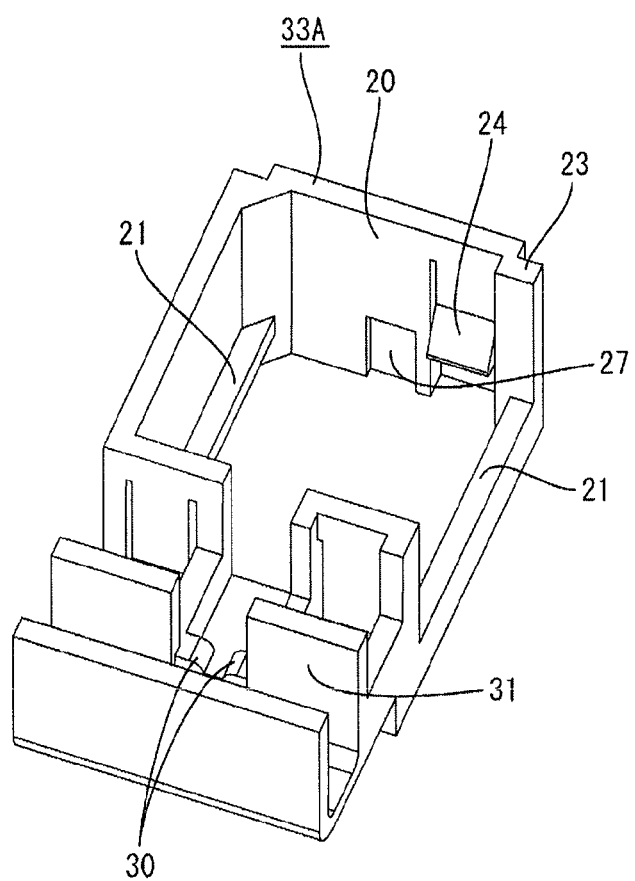
FIG. 8 is a perspective view of an auxiliary insulating member.
Figure 9:
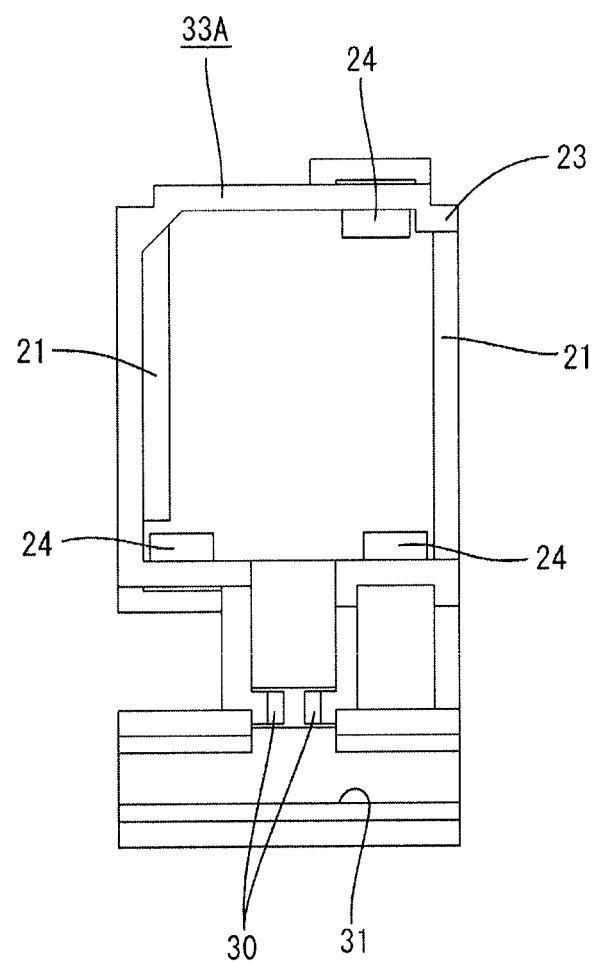
FIG. 9 is a plan view of the auxiliary insulating member.

The auxiliary insulating member 33A is held on the end portion of the bus bar 17 positioned in the left end portion in FIG. 1. With reference to FIGS. 8 and 9, the auxiliary insulating member 33A has a housing 20 accommodating the bus bar 17, a holder 30 holding a voltage detection line, and a wire housing groove 31 in which the wire 28 is placed. The housing 20 above has a similar structure to the housing 20 on the right-hand side of the bus bar insulating member 18 in FIG. 3, and thus a detailed description is omitted. The holder 30 and the wire housing groove 31 also have similar structures to the holder 30 and the wire housing groove 31 on the right-hand side of the bus bar insulating member 18 in FIG. 3, and thus detailed descriptions are omitted.

Figure 10:
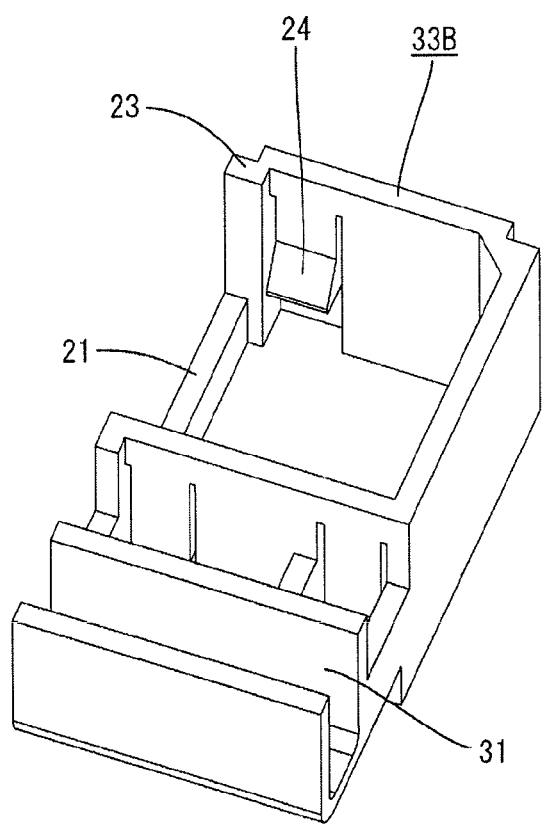
FIG. 10 is a perspective view of an auxiliary insulating member.
Figure 11:
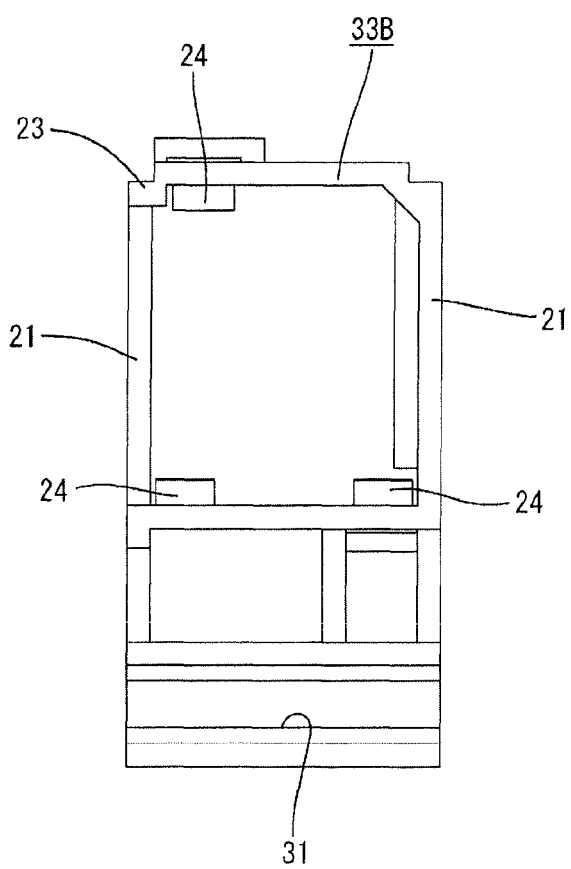
FIG. 11 is a plan view of the auxiliary insulating member.

The auxiliary insulating member 33B is held on the end portion of the bus bar 17 positioned in the right end portion in FIG. 1. With reference to FIGS. 10 and 11, the auxiliary insulating member 33B has a housing 20 accommodating the bus bar 17 and a wire housing groove 31 in which the wire 28 is placed. The housing 20 and the wire housing groove 31 are connected by a rib. The housing 20 above has a similar structure to the housing 20 on the left-hand side of the bus bar insulating member 18 in FIG. 3, and thus a detailed description is omitted.

(Assembly Process)

Hereafter, an example process of assembling the battery module 10 according to the present embodiment is described. The process of assembling the battery module 10 is not limited to the description in the present embodiment.

First, the plurality of bus bar insulating members 18 are produced by injection-molding a synthetic resin using a mold (not shown in the drawings). Then, the plurality of bus bar insulating members 18 and the auxiliary insulating members 33A and 33B are aligned with predetermined gaps therebetween. At this time, the bus bar insulating members 18 may be lined up on a jig (not shown in the drawings) that temporarily positions a bus bar 17 holder 30 material.

Subsequently, the bus bars 17 are fitted from above into the housings 20 of the bus bar insulating members 18 and the auxiliary insulating members 33A and 33B. Then, the bus bars 17 are held between the placement portions 21 and the engagement tabs 24 of the bus bar insulating members 18, and thus are held in the housings 20.

Subsequently, the barrel 29 of the voltage detection terminal 25 is clamped to an end portion of the wire 28, and the voltage detection terminal 25 and the wire 28 are attached to the bus bar insulating member 18 and the auxiliary insulating member 33A. Specifically, the voltage detection terminal 25 is fitted from above into the right-hand housing 20 of the two housings 20 of the bus bar insulating member 18. The voltage detection terminal 25 is held by the engagement tab 24. Furthermore, the engagement projection 26 of the voltage detection terminal 25 is engaged with the engagement recess 27 of the bus bar insulating member 18.

The barrel 29 of the voltage detection terminal 25 is held by the holder 30 of the bus bar insulating member 18. The wire 28 connected to the barrel 29 is fitted into the wire housing groove 31 from above through the space between the holding tabs 32. The wire 28 fitted into the wire housing groove 31 is inhibited from coming out of the wire housing groove 31 by the holding tabs 32. Thus, the wiring module 15 is completed.

Then, the wire 28 connection assembly is lifted and placed on upper surfaces of the plurality of aligned electric cells 14. Then, the positive electrodes 11 and the negative electrodes 12 of the electric cells 14 are inserted from below into the respective through-holes 16A in the bus bars 17. A production tolerance between the adjacent positive electrode 11 and negative electrode 12 and an assembly tolerance are met by the through-hole 16A in the bus bar 17.

As described above, the production tolerance between the adjacent positive electrode 11 and negative electrode 12 of the electric cells 14 and the assembly tolerance are met by the through-hole 16A in the bus bar 17. With the plurality of electric cells 14 aligned, however, the tolerances above are accumulated and thus may not be met by the through-holes 16A in the bus bars 17. In the present embodiment, the bus bar insulating members 18 are movably held by the bus bars 17, and thus the bus bar insulating members 18 can be moved relative to the bus bars 17 to meet the accumulated tolerances.

Subsequently, the nuts are screwed to the positive electrodes 11 and the negative electrodes 12 inserted through the through-holes 16A of the bus bars 17. This connects the bus bars 17 and the voltage detection terminals 25 to the positive electrodes 11 and the negative electrodes 12. Thus, the battery module 10 is completed.

Functions and Effects of the Embodiment

Functions and effects of the present embodiment are described below. In the present embodiment, the plurality of aligned electric cells 14 are connected by the wiring module 15. The wiring module 15 has the bus bar insulating members 18 each held by the adjacent bus bars 17. Of the plurality of bus bar insulating members 18, a first bus bar insulating member 18 and a second bus bar insulating member 18 are connected by the bus bar 17.

According to the present embodiment, to connect the electrode terminals 13 of the plurality of aligned electric cells 14, the bus bars 17 and the wiring module 15 connected by the bus bars 17 are simply attached to the plurality of aligned electric cells 14. This simplifies connection of the electrode terminals 13 in a plurality of locations.

When the number of connected electric cells 14 is changed, the number of the bus bars 17 and the number of the bus bar insulating members 18 can be changed to match. Thus, a mold to form one bus bar insulating member 18 is prepared and a plurality of bus bar insulating members 18 are formed. A required number of bus bar insulating members 18 can then be connected by the bus bars 17 so as to match the change in the number of the connected electric cells 14. Accordingly, unlike a case where an integrated battery connection plate is produced, it is unnecessary to increase the size of a mold due to an increase in the number of the connected electric cells 14, or to prepare a separate mold to form a battery connection plate whenever the number of the connected electric cells 14 changes. Thus, production cost can be reduced.

Furthermore, in the present embodiment, two bus bar insulating members 18 connected by the bus bar 17 are movable relative to the bus bar 17. Thus, production tolerances among the electrode terminals 13 of the plurality of electric cells 14 and assembly tolerances can be met due to relative movement of the bus bars 17 and the bus bar insulating members 18.

According to the present embodiment, the inner diameter of the through-hole 16A in the bus bar 17 is defined large enough to accommodate a production tolerance between an adjacent positive electrode 11 and negative electrode 12, as well as an assembly tolerance.

Figure 12:
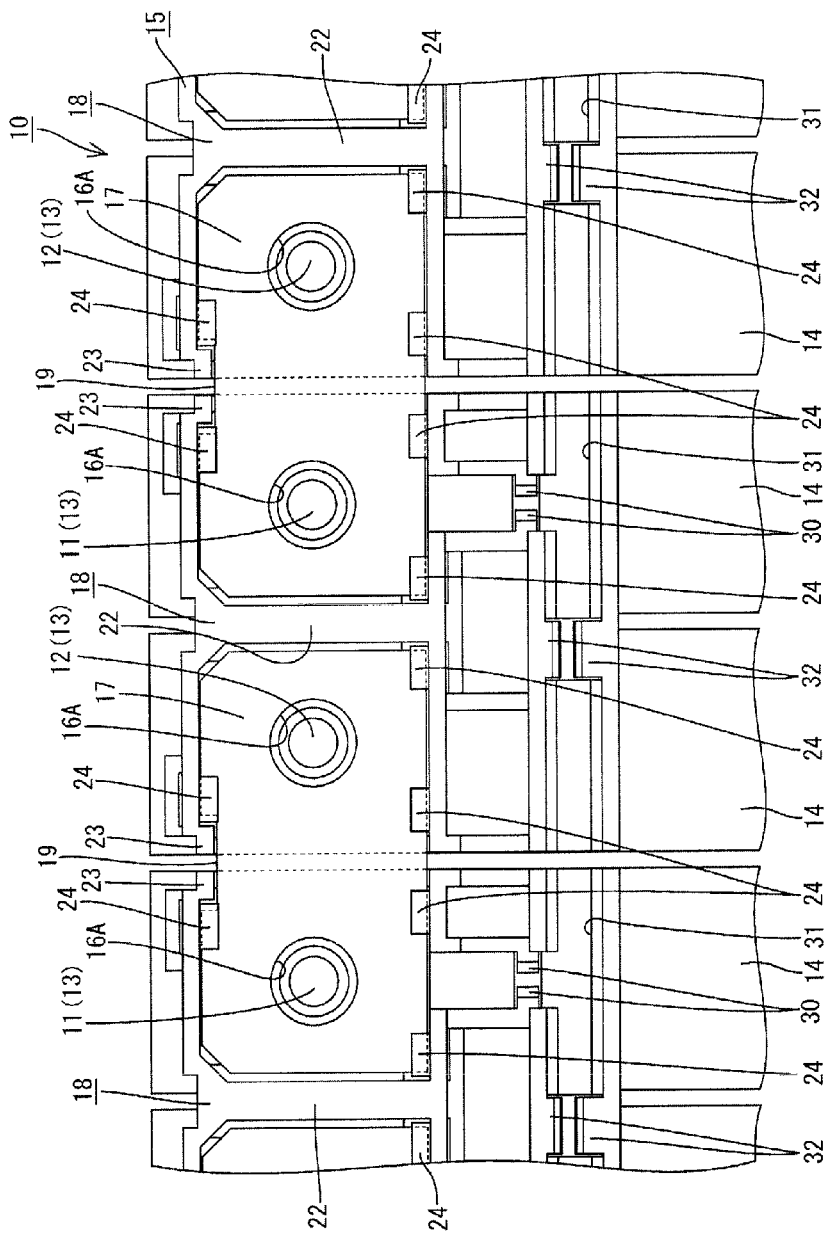
FIG. 12 is a virtual plan view of a battery module in which positive electrodes and negative electrodes are disposed in proper positions.

FIG. 12 illustrates a virtual state in which the positive electrodes 11 and the negative electrodes 12 of the plurality of aligned electric cells 14 are provided in proper positions according to design. In this state, each of the positive electrodes 11 and the negative electrodes 12 is disposed at the center position of the through-hole 16A in the bus bar 17. The bus bar insulating members 18 connected by the bus bars 17 are aligned with a predetermined distance therebetween.

Figure 13:
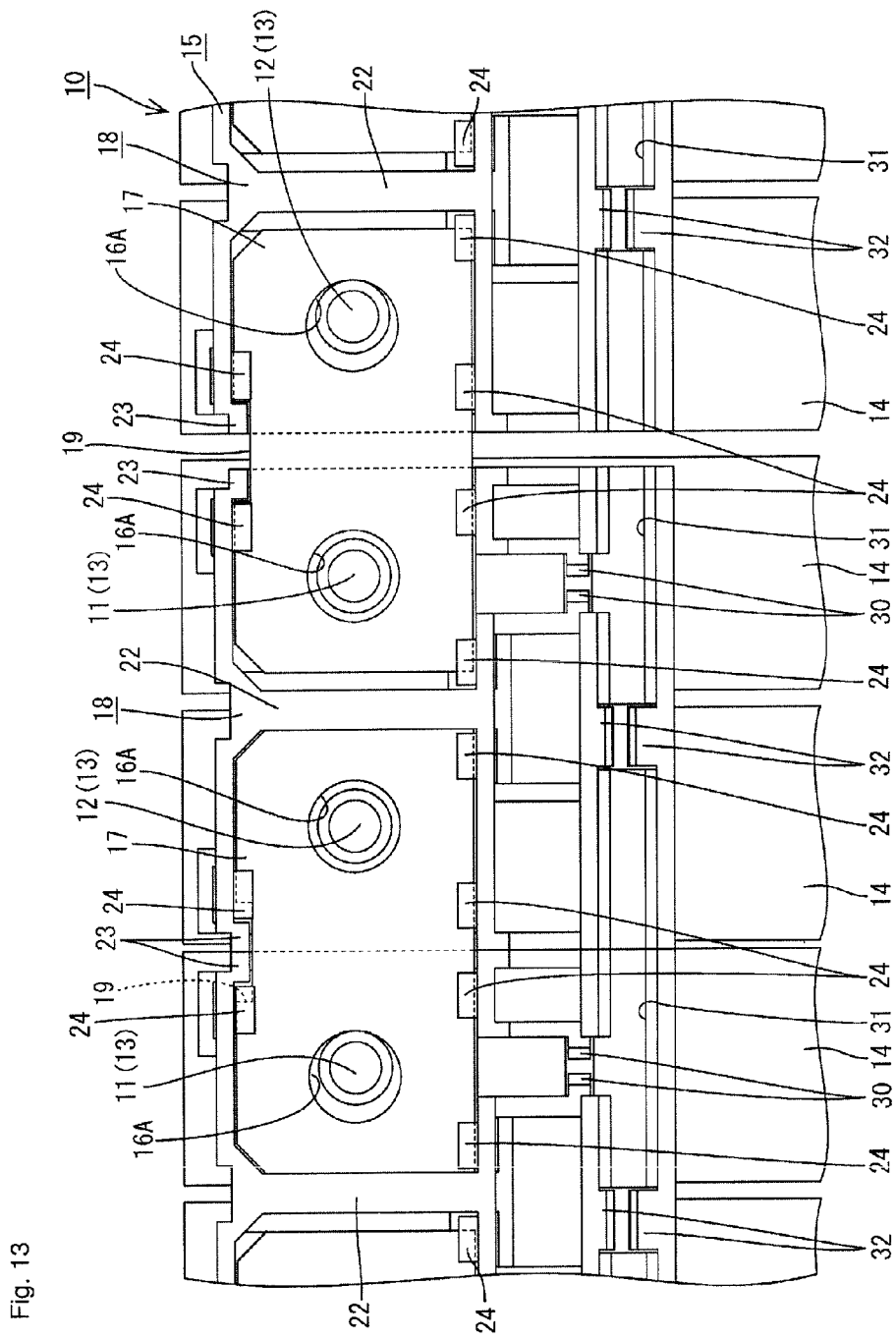
FIG. 13 is a virtual plan view of a battery module in a state where gaps between adjacent bus bar insulating members are different.

FIG. 13 illustrates a virtual state in which the positive electrodes 11 and the negative electrodes 12 of the plurality of aligned electric cells 14 are aligned within production tolerance and assembly tolerance. A misalignment in pitch between the adjacent positive electrode 11 and negative electrode 12 is absorbed by the inner diameter of the through-hole 16A in the bus bar 17.

In a case where tolerances of the plurality of electric cells 14 are accumulated and thus cannot be met by the inner diameters of the through-holes 16A in the bus bars 17, the bus bars 17 and the bus bar insulating members 18 are moved relative to each other to meet the tolerances. For instance, a tolerance can be met even in a case where the first bus bar insulating member 18 and the second bus bar insulating member 18 are close to each other and thus a gap between the adjacent positive electrode 11 and negative electrode 12 cannot be absorbed by the inner diameter of the through-hole 16A in the bus bar 17. Furthermore, a tolerance can be met even in a case where the first bus bar insulating member 18 and the second bus bar insulating member 18 are distant from each other and thus a gap between the adjacent positive electrode 11 and negative electrode 12 cannot be absorbed by the inner diameter of the through-hole 16A in the bus bar 17.

Even in a case where the first bus bar insulating member 18 and the second bus bar insulating member 18 are moved relative to each other, the engagement tab 24 is provided in a position to hold and lock the bus bar 17 from above (thickness direction of the bus bar 17) with the placement portion 21.

In the present embodiment, the bus bar insulating members 18 are held by the bus bars 17 with clearances. A simple method of providing the clearances between the bus bars 17 and the bus bar insulating members 18 allows production tolerances among the electrode terminals 13 of the plurality of electric cells 14, as well as assembly tolerances to be met.

Furthermore, in the present embodiment, the bus bar insulating member 18 has the placement portion 21 on which the bus bar 17 is placed and the engagement tab 24 that holds and locks the bus bar 17 in the thickness direction. A clearance is provided between the bus bar 17 and the placement portion 21 or the engagement tab 24 in the thickness direction of the bus bar 17.

Figure 14:
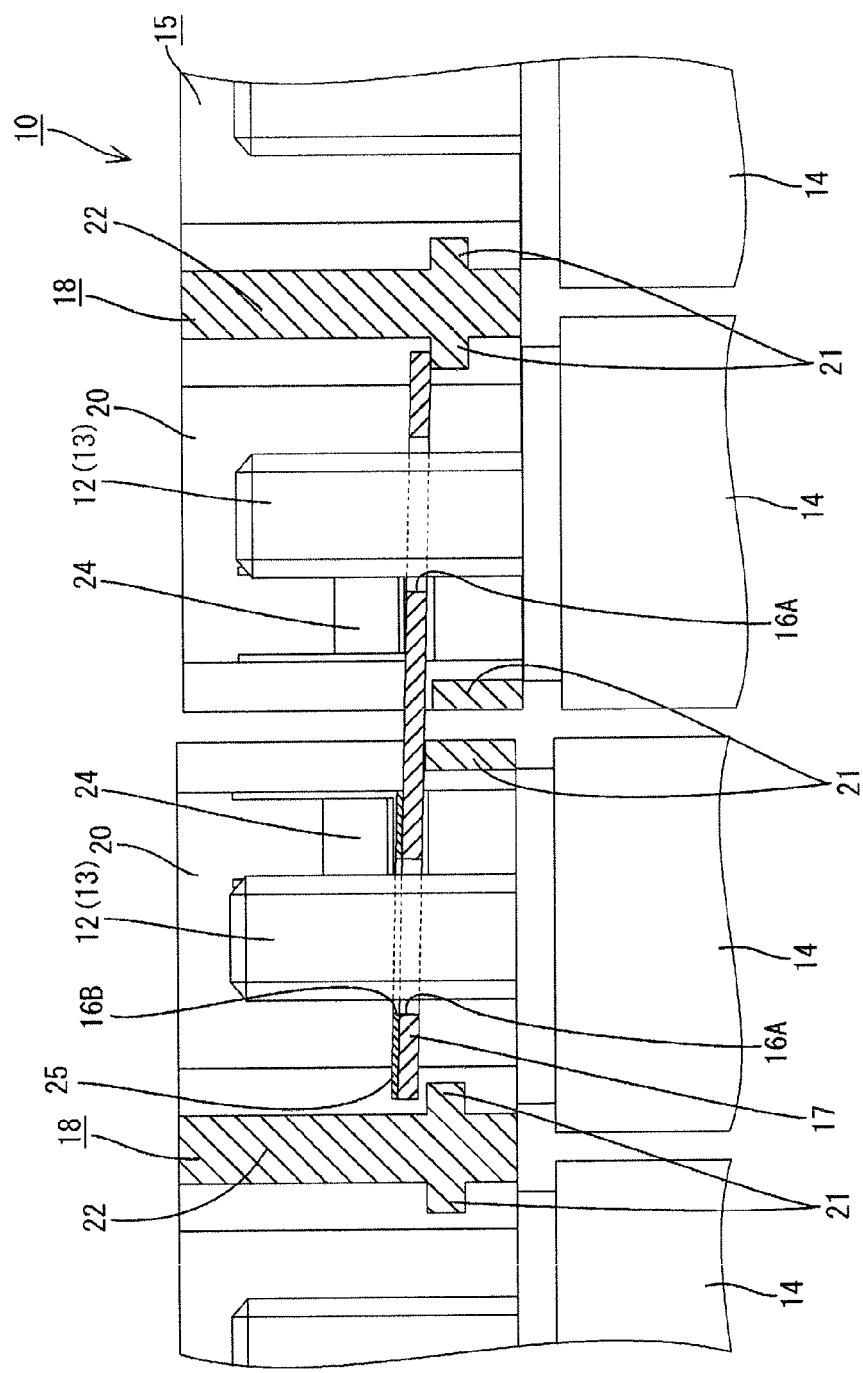
FIG. 14 is a cross-sectional view of a battery module in a state where vertical positions of adjacent electric cells are misaligned within a tolerance.

According to the configuration above, the bus bar 17 is held by the bus bar insulating member 18 in a simple configuration in which the engagement tab 24 is locked. Furthermore, the clearances above meet the tolerances among the electrode terminals 13 of the plurality of electric cells 14 in the thickness direction of the bus bar 17. More specifically, FIG. 14 illustrates a configuration in which adjacent electric cells 14 are aligned within a vertical tolerance. A step is formed within the vertical tolerance for the electrode terminal 13 of the electric cell 14 on the left-hand side and the electrode terminal 13 of the electric cell 14 on the right-hand side in FIG. 14.

According to the present embodiment, the bus bar 17 inclines within a range of the clearance, which is provided between the bus bar 17 and the placement portion 21 or the engagement tab 24. Thus, even with a vertical step between the aligned electric cells 14, the bus bars 17 and the electrode terminals 13 can be connected. In the present embodiment, the bus bar 17 may be in contact with the placement portion 21. Alternatively, the bus bar 17 may be in contact with the engagement tab 24.

In addition, the voltage detection terminal 25 is placed on one bus bar 17, and a predetermined clearance is also provided between the voltage detection terminal 25 and the engagement tab 24. Thus, even in a state where the bus bar 17 and the voltage detection terminal 25 are stacked, the vertical tolerance between the aligned electric cells 14 can be met.

When the plurality of bus bars 17 and the plurality of bus bar insulating members 18 are connected, relatively large forces are applied to the engagement tabs 24 due to weights of the bus bars 17 and the bus bar insulating members 18. This may lead to defects, such as deformation of the engagement tabs 24. In view of the above, in the present embodiment, the bus bar insulating member 18 has the plurality of engagement tabs 24 aligned in a direction in which the bus bar insulating members 18 are connected. With the plurality of engagement tabs 24 aligned in the direction in which the bus bar insulating members 18 are connected, the force exerted on each of the engagement tabs 24 is distributed in the bus bar insulating members 18. This inhibits defects stemming from the relatively large forces applied to the engagement tabs 24.

In addition, in the present embodiment, the recess 19 is provided in the surface of the bus bar 17, and the projection 23 that engages with the recess 19 is provided in the bus bar insulating member 18. This connects the bus bar 17 and the bus bar insulating member 18 with each other in a simple configuration in which the recess 19 and the projection 23 are engaged.

Furthermore, the recess 19 and the projection 23 are engaged with a clearance therebetween. This meets production intersections among the electrode terminals 13 of the plurality of electric cells 14 and assembly tolerances in a direction parallel to a plate surface of the bus bar 17.

In addition, the recess 19 is provided spanning a portion where the first bus bar insulating member 18 and the second bus bar insulating member 18 are connected by the bus bar 17. The projection 23 is provided in a portion opposite to the recess 19 on the first bus bar insulating member 18 and the second bus bar insulating member 18. This simplifies a structure of the bus bar 17, as compared with a case where the recesses 19 are provided corresponding to each of the first bus bar insulating member 18 and the second bus bar insulating member 18.

Engagement between the recess 19 and the projection 23 prevents disengagement of the bus bar 17 and the first bus bar insulating member 18 as well as disengagement of the bus bar 17 and the second bus bar insulating member 18. This simplifies the structures of the bus bar 17 and the bus bar insulating member 18, as compared with a case where a structure is separately provided to prevent disengagement of the bus bar 17 and the bus bar insulating member 18.

Furthermore, in the present embodiment, the insulating wall 22 that separates adjacent bus bars 17 is provided in the bus bar insulating member 18. This ensures insulation between the adjacent bus bars 17. In addition, the height of the insulating wall 22 is defined such that the positive electrode 11 and the negative electrode 12 are not short-circuited by a tool. Thus, the positive electrode 11 and the negative electrode 12 are inhibited from being short-circuited during attachment of the wiring module 15.

Of the plurality of bus bars 17, the bus bar 17 positioned in the end portion may be exposed from the bus bar insulating member 18, thus potentially coming into contact with another member or tool and short-circuiting. According to the present embodiment, the bus bars 17 positioned in the end portions of the plurality of bus bars 17 hold the synthetic resin auxiliary insulating members 33A and 33B on the end portions opposite to the end portions where the bus bar insulating members 18 are held. This insulates the bus bar 17, thus inhibiting the bus bar 17 positioned in the end portion of the battery module 10 from being short-circuited by another member or tool.

Second Embodiment

Figure 15:
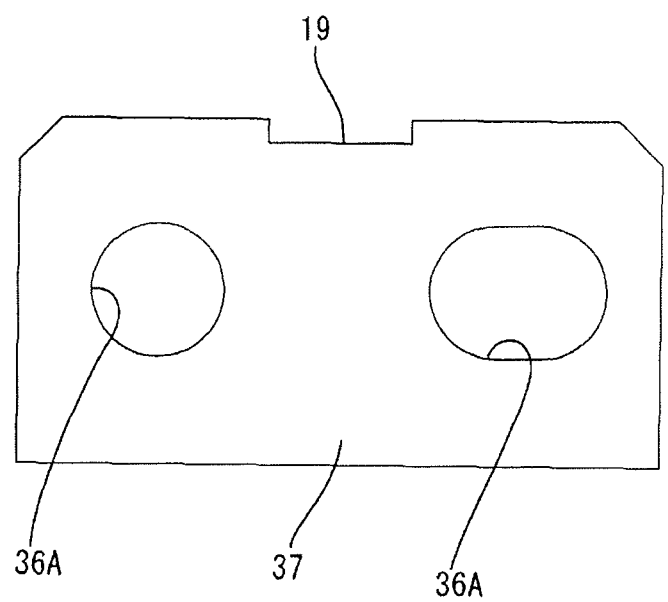
FIG. 15 is a plan view of a bus bar according to a second embodiment of the present invention.
Figure 16:
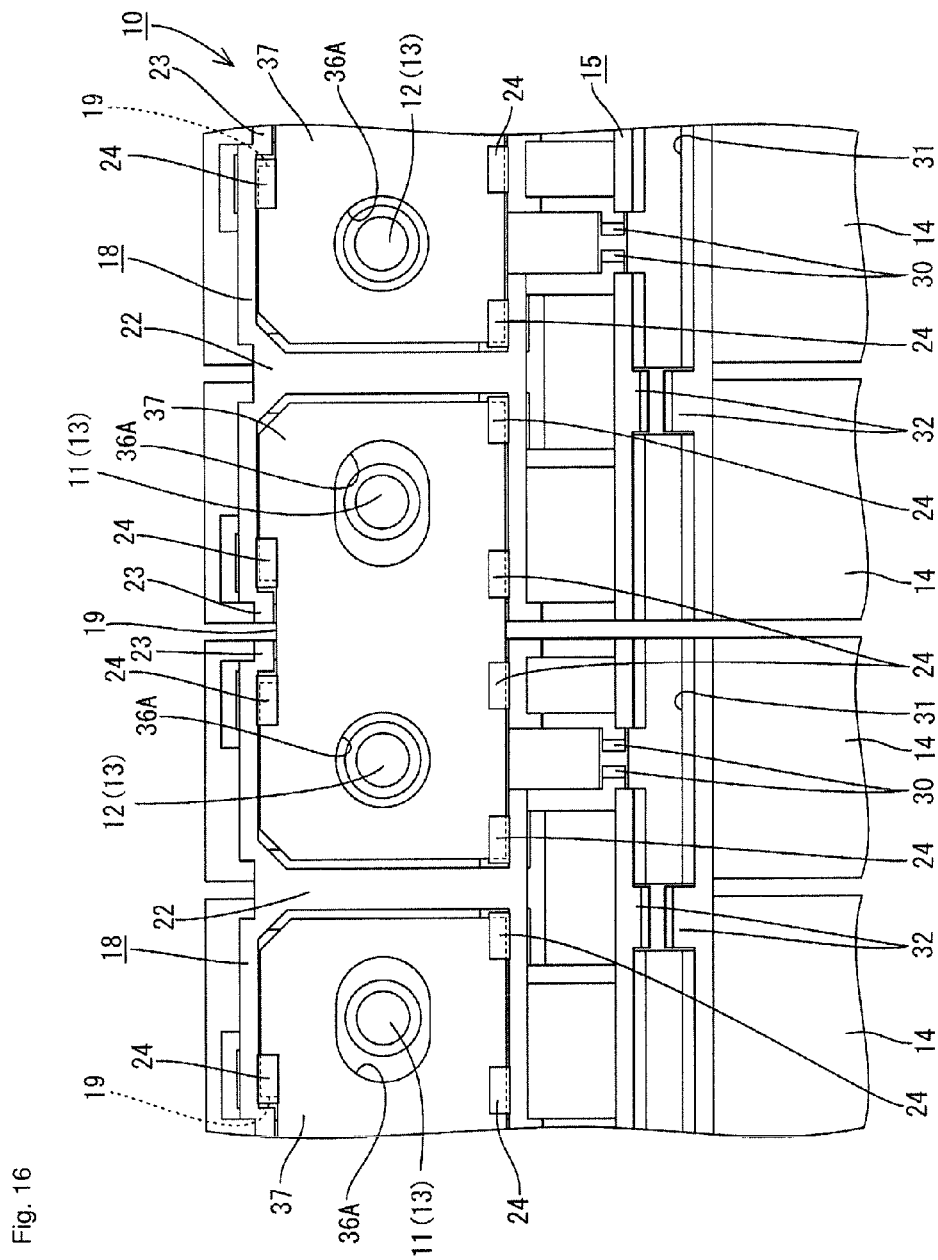
FIG. 16 is a plan view of a battery module according to the second embodiment.
Figure 17:
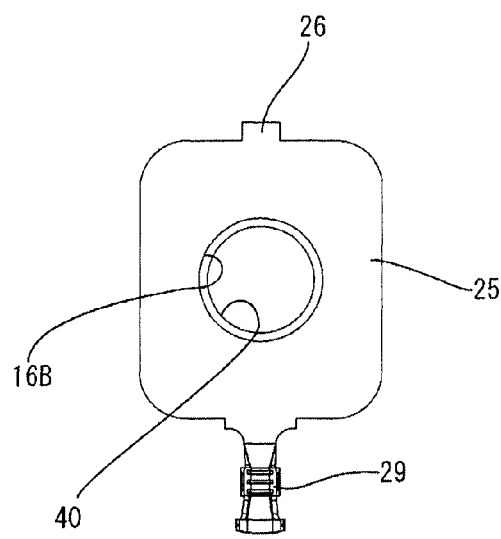
FIG. 17 is a plan view of a voltage detection terminal according to a third embodiment of the present invention.
Figure 18:
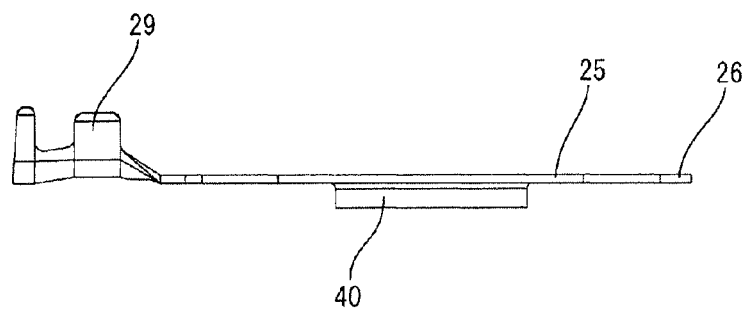
FIG. 18 is a side view of the voltage detection terminal.

A second embodiment of the present invention is described below with reference to FIGS. 15 and 16. In the present embodiment, of a pair of through-holes 36A in a bus bar 37, the through-hole 36A positioned on a right-hand side in FIG. 15 is a hole elongated in a left-right direction. With reference to FIG. 16, the elongated hole has a long diameter in a direction in which a plurality of bus bar insulating members 18 are connected. According to the configuration, a production tolerance and an assembly tolerance between a positive electrode 11 and a negative electrode 12 of adjacent electric cells 14 can be met with confidence by the elongated hole in the bus bar 37.

Configurations, functions and effects other than the above are substantially the same as those of the first embodiment. Thus, the same members are denoted with the same reference numerals and redundant descriptions are omitted.

In the present embodiment, one of the pair of the through-holes 36A in the bus bar 17 is an elongated hole, but the pair of through-holes 36 may both be elongated holes.

Third Embodiment

A third embodiment of the present invention is described below with reference to FIGS. 17 to 20. In the present embodiment, a through-hole 16A in a voltage detection terminal 25 has, on an inner edge, an engagement portion 40 projecting downward and engaging with an inner edge of a through-hole 16B in a bus bar 17 when being placed on an upper surface of the bus bar 17. In the present embodiment, the engagement portion 40 is provided along an entire periphery of the inner edge of the through-hole 16B in the voltage detection terminal 25. The engagement portion 40 has a downward projection height the same as or slightly less than a thickness of the bus bar 17.

Figure 19:
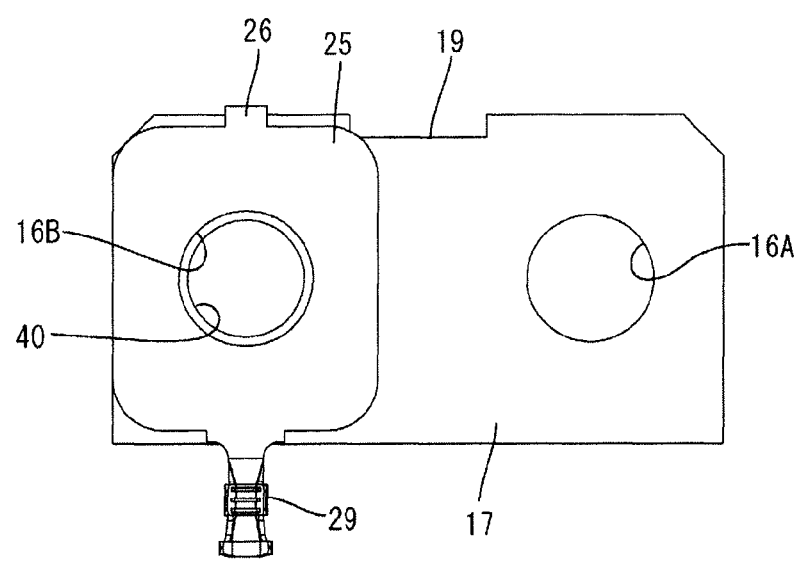
FIG. 19 is a plan view illustrating a state where the voltage detection terminal is placed on an upper surface of the bus bar.
Figure 20:
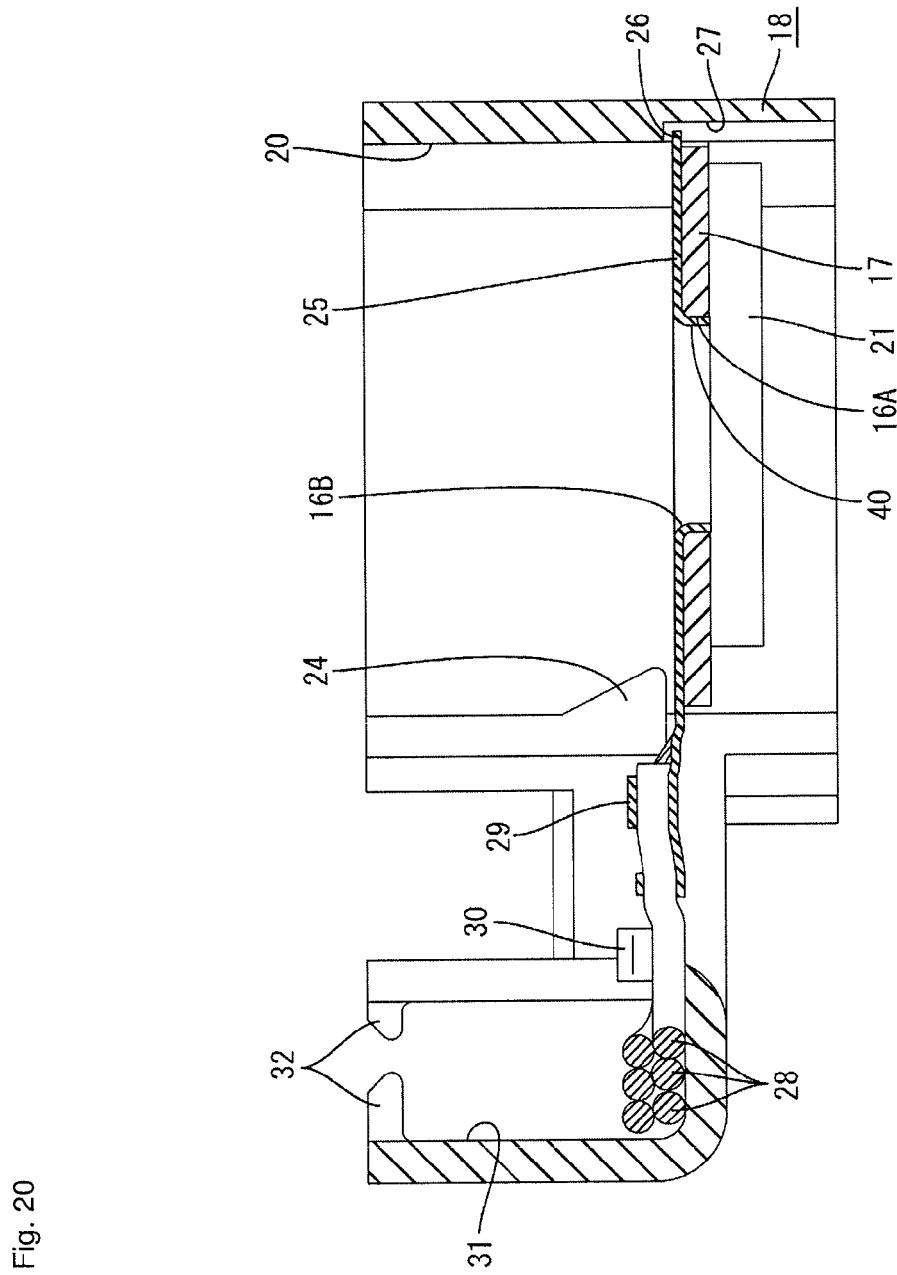
FIG. 20 is a cross-sectional view illustrating the state where the voltage detection terminal is placed on the upper surface of the bus bar.

With reference to FIGS. 19 and 20, the voltage detection terminal 25 is placed on the upper surface of the bus bar 17, and then the engagement portion 40 is inserted into the through-hole 16A in the bus bar 17. Then, an outer surface of the engagement portion 40 is pressed against an inner peripheral surface of the through-hole 16A of the bus bar 17. Thus, the voltage detection terminal 25 and the bus bar 17 are engaged.

The bus bar 17 and the voltage detection terminal 25 are connected to an electrode terminal 13 of an electric cell 14. In this state, when the bus bar 17 and the voltage detection terminal 25 are independently movable, there may be a case where the voltage detection terminal 25 is not accommodated in a proper position even when the bus bar 17 is accommodated in a proper position. It is then necessary to position the bus bar 17 and the electrode terminal 13 in proper positions and to position the voltage detection terminal 25 and the electrode terminal 13 as separate tasks. This decreases workability in connecting the bus bar 17 and the voltage detection terminal 25 to the electrode terminal 13. In the embodiment above, the bus bar 17 and the voltage detection terminal 25 are engaged with each other by the engagement portion 40, thus preventing the bus bar 17 and the voltage detection terminal 25 from moving independently. This improves workability in connecting the bus bar 17 and the voltage detection terminal 25 to the electrode terminal 13.

Configurations, functions and effects other than the above are substantially the same as those of the first embodiment. Thus, the same members are denoted with the same reference numerals and redundant descriptions are omitted.

In the present embodiment, the engagement portion 40 is provided along the entire periphery of the inner edge of the through-hole 16B in the voltage detection terminal 25. Configurations are not limited to the above, however, and the engagement portion 40 may be partially provided on the inner edge of the through-hole 16B in the voltage detection terminal 25. Furthermore, the engagement portion 40 may project outward from an outer edge portion of the voltage detection terminal 25 and may be bent downward at a right angle. One or more engagement portions 40 may be provided in any position on the voltage detection terminal 25 in any shape as required.

Fourth Embodiment

Figure 21:
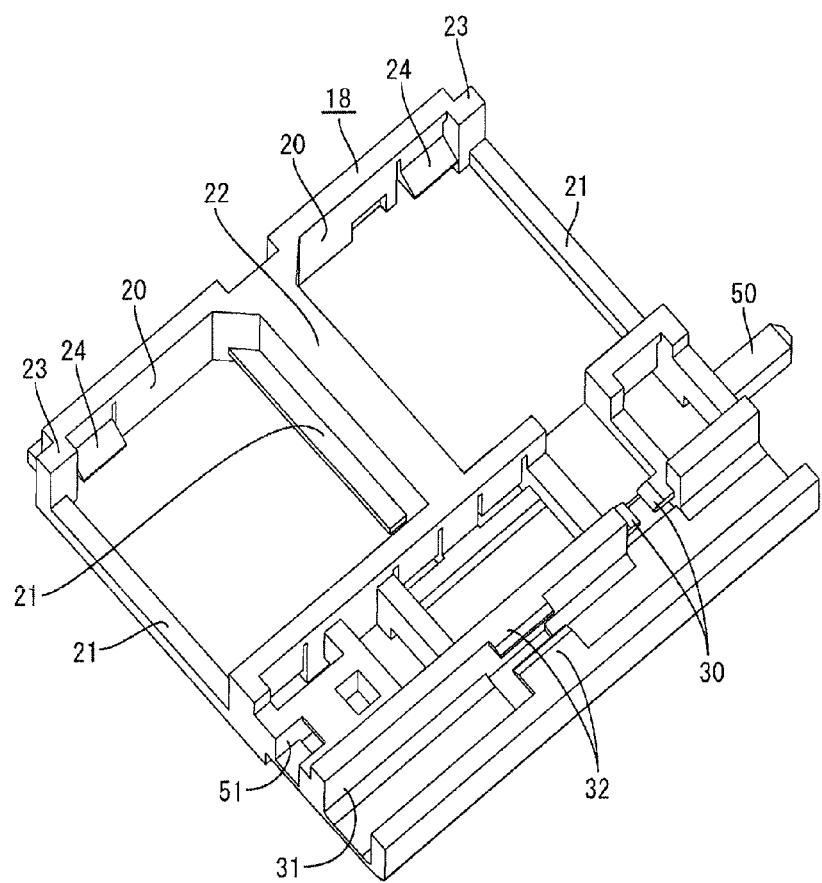
FIG. 21 is a perspective view of a bus bar insulating member according to a fourth embodiment of the present invention.
Figure 22:
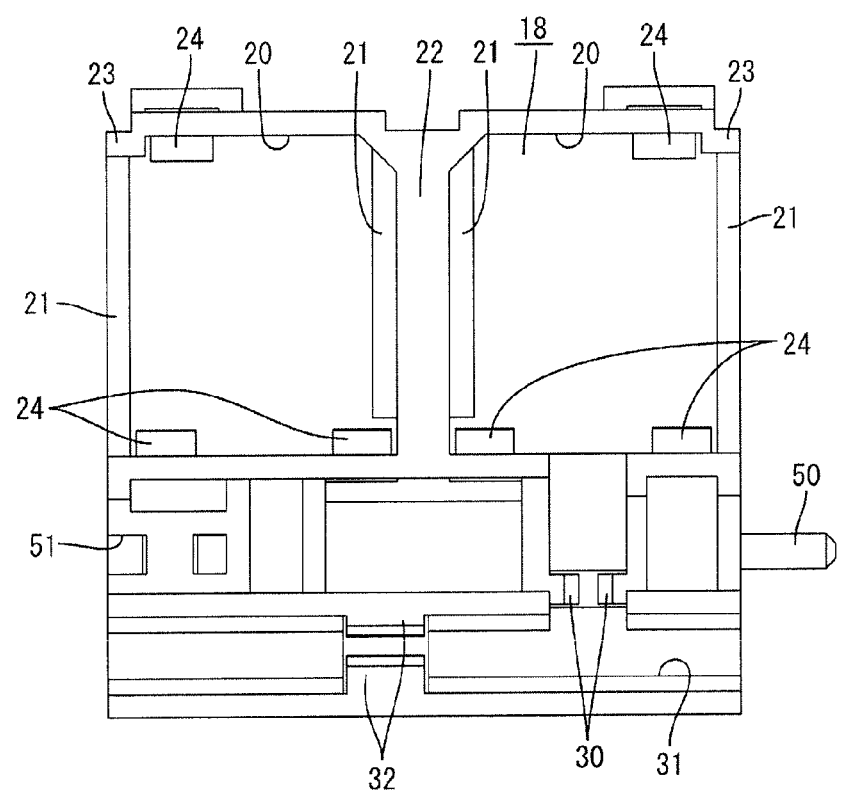
FIG. 22 is a plan view of the bus bar insulating member.

A fifth embodiment of the present invention is described below with reference to FIGS. 21 to 23. In the present embodiment, a bus bar insulating member 18 has a guide 50 having a planar shape projecting to the right in a position between a housing 20 and a wire housing groove 31 on a right edge of the bus bar insulating member 18. Furthermore, the bus bar insulating member 18 has a guide receiver 51 to which the guide 50 is inserted (received), the guide receiver 51 being recessed to the right in a position between the wire housing groove 31 and the housing 20 on a left edge of the bus bar insulating member 18.

Figure 23:
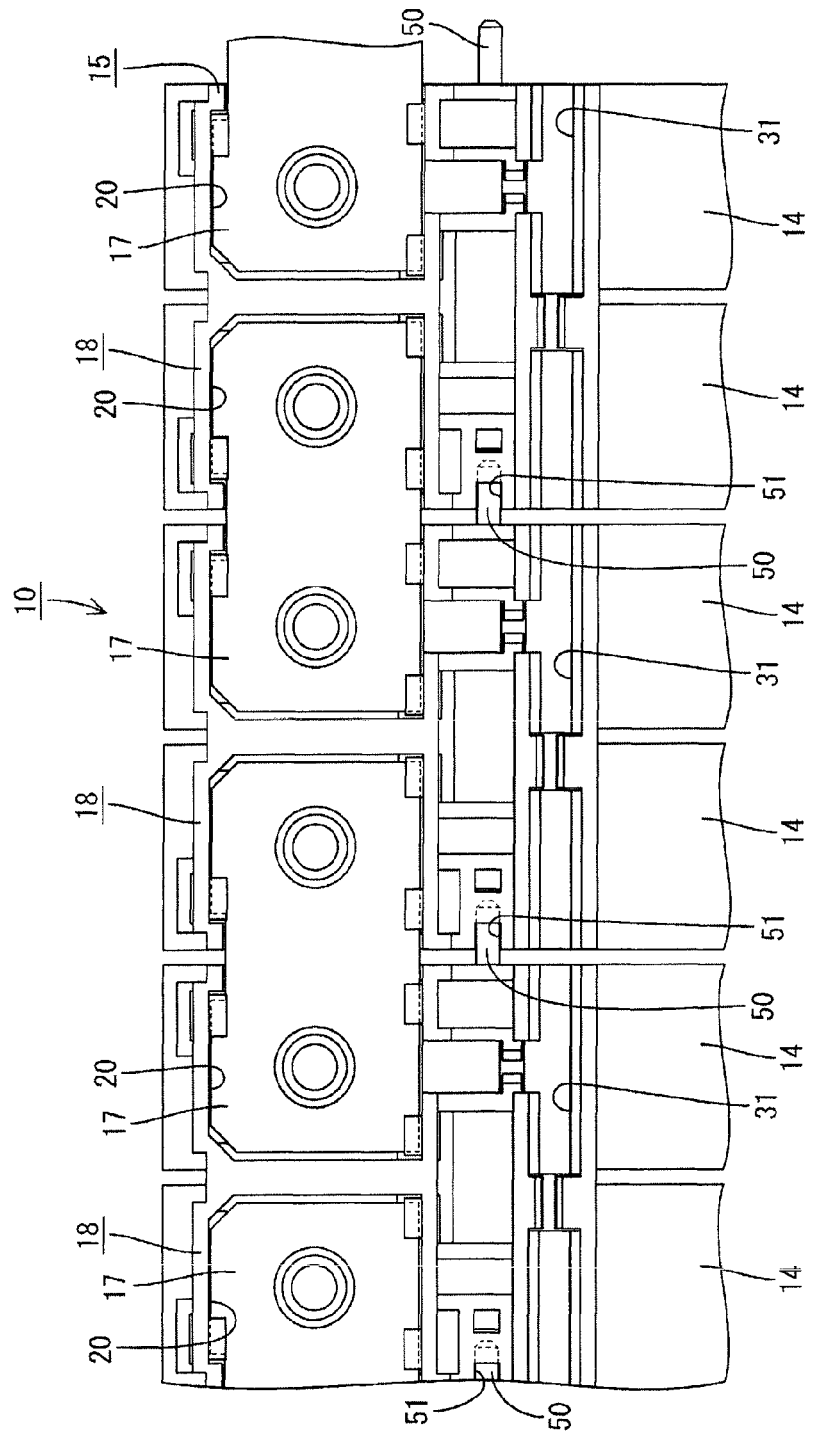
FIG. 23 is a plan view of a battery module according to the fourth embodiment.

With reference to FIG. 23, when a plurality of bus bar insulating members 18 are aligned in the left-right direction, the guide 50 of a first bus bar insulating member 18 is inserted into the guide receiver 51 of a second bus bar insulating member 18 adjacent to the right of the first bus bar insulating member 18.

The guide receiver 51 has a lower wall which is brought into contact with the guide 50 from below, an upper wall which is brought into contact with the guide 50 from above, and a side wall which is brought into contact with the guide 50 from a direction intersecting a vertical direction.

According to the present embodiment, the guide 50 is received by the guide receiver 51, thus improving workability of assembling the first bus bar insulating member 18 and the second bus bar insulating member 18.

Furthermore, since the guide 50 is received by the guide receiver 51, displacement of the first bus bar insulating member 18 and the second bus bar insulating member 18 can be inhibited in the direction intersecting the direction in which the guide 50 extends. This improves strength of the battery module 10 as a whole.

Configurations, functions and effects other than the above are substantially the same as those of the first embodiment. Thus, the same members are denoted with the same reference numerals and redundant descriptions are omitted.

In the present embodiment, the guide 50 has a planar shape. Configurations are not limited to the above, however. An engagement tab (not shown in the drawings) may be provided on a front end of the guide 50 and an engagement hole (not shown in the drawings) may be provided in the guide receiver 51 to allow engagement with the engagement projection. Furthermore, two or more guides 50 may be provided. In this case, two or more guide receivers 51 are preferably provided corresponding to the guides 50.

Fifth Embodiment

Figure 24:
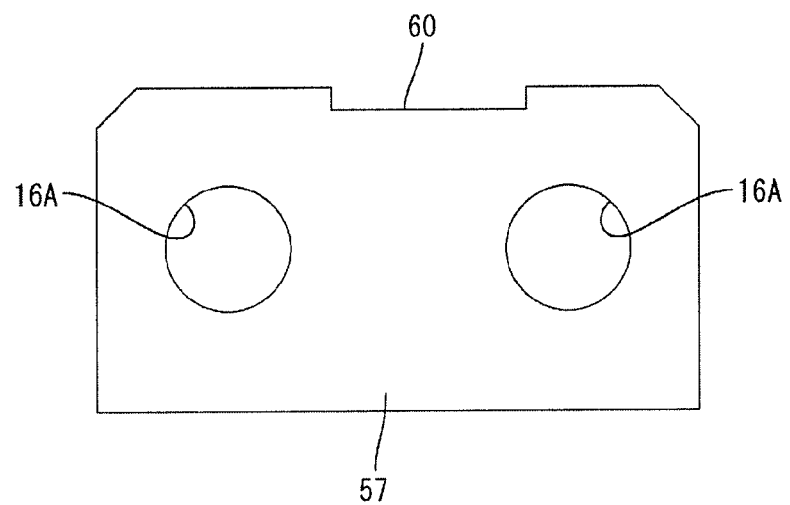
FIG. 24 is a plan view of a bus bar according to a fifth embodiment of the present invention.

A fourth embodiment of the present invention is described below with reference to FIGS. 24 and 25. A recess 60 in a bus bar 57 according to the present embodiment is provided toward the right side of FIG. 24 as a whole.

Figure 25:
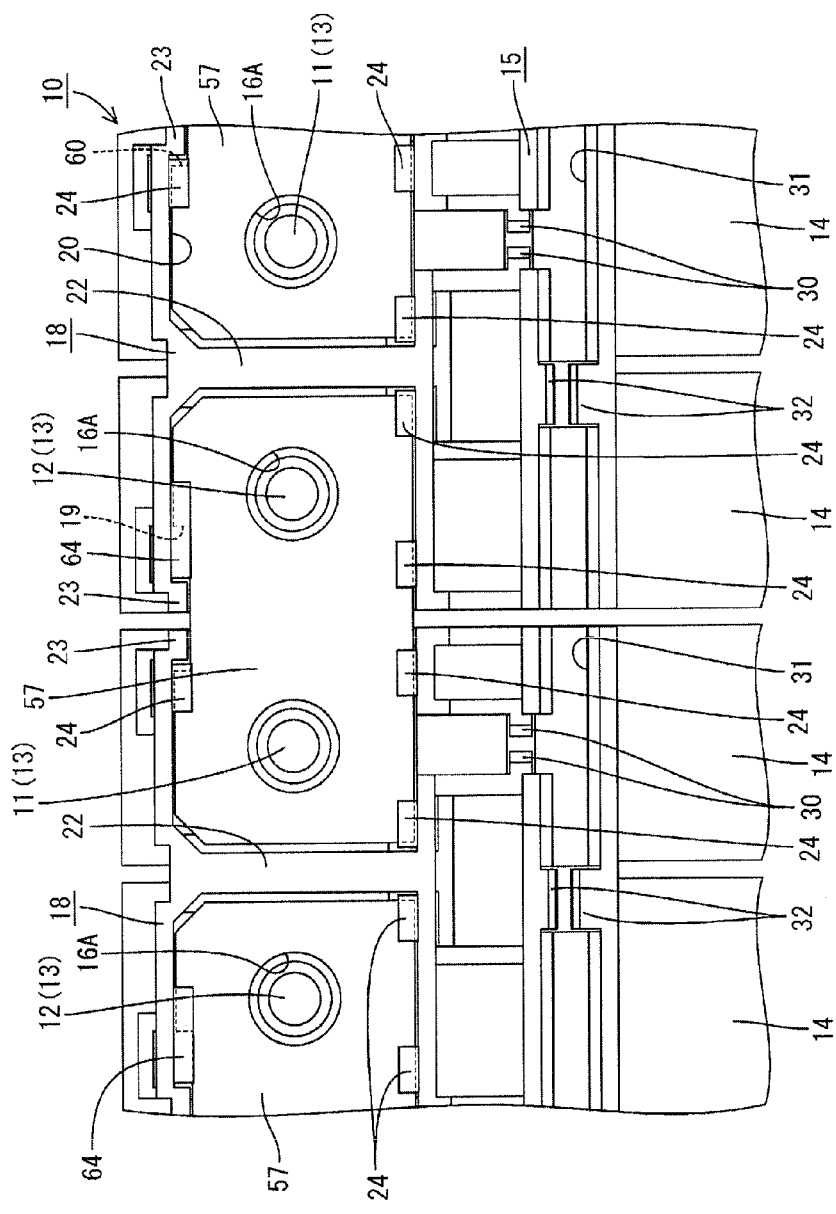
FIG. 25 is a plan view of a battery module according to the fifth embodiment.

With reference to FIG. 25, the bus bar 57 according to the present embodiment is accommodated in a housing 20 of a bus bar insulating member 18, and then the bus bar 57 is fixated and held, without a clearance, in the housing 20 of the bus bar insulating member 18 on the left of the bus bar 57, while the bus bar 57 is held with a clearance in the housing 20 of the bus bar insulating member 18 on the right of the bus bar 57. An engagement tab 64 in the housing 20 of the bus bar insulating member 18 on the right of the bus bar 57 extends in the left-right direction, thus being able to hold the bus bar 57 in a thickness direction of the bus bar 57, which moves relatively in the left-right direction.

In the present embodiment, the bus bar insulating member 18 on the right of the bus bar 57 and the bus bar 57 move relative to each other, thus meeting tolerances among electrode terminals 13 of a plurality of aligned electric cells 14.

Configurations other than the above are substantially the same as those of the first embodiment. Thus, the same members are denoted with the same reference numerals and redundant descriptions are omitted.

Other Embodiments

The present invention is not limited to the embodiments above described with reference to the drawings. Embodiments below, for example, are also included in a technical scope of the present invention.

(1) A first bus bar insulating member 18 and a second insulating member may both be fixated and held by a bus bar 17. In this case, a tolerance of a positive electrode 11 and a negative electrode 12 is preferably met by a connection portion on the bus bar 17. For instance, the connection portion may be a through-hole, whose inner diameter is defined so as to meet the tolerance of the positive electrode 11 and the negative electrode 12.

(2) In the present embodiment, the bus bar 17 is fitted into the housing 20 from above (thickness direction of the bus bar 17). However, configurations are not limited to the above. The bus bar 17 may be fitted into the housing 20 from a direction parallel to a plane surface of the bus bar 17. Furthermore, the bus bar 17 is held by the engagement tab 24 in the housing 20. However, configurations are not limited to the above. The bus bar 17 may be held in the housing 20 by molding, adhesion, screwing, or any other method as required.

(3) In the present embodiment, the bus bar insulating member 18 is held by the bus bar 17 with a clearance. However, configurations are not limited to the above. An elastically deformable engagement piece may be provided extending from the bus bar insulating member 18 toward the bus bar 17 and the engagement piece and the bus bar 17 may be engaged such that the bus bar insulating member 18 is movably connected to the bus bar 17.

(4) In the present embodiment, the recess 19 is provided in the bus bar 17 and the projection 23 is provided on the bus bar insulating member 18. However, configurations are not limited to the above. The projection 23 may be provided on the bus bar 17 and the recess 19 may be provided in the bus bar insulating member 18.

(5) In the present embodiment, the connection portion is the through-hole 16A passing through the bus bar 17. However, configurations are not limited to the above. The connection portion may be a U-shaped groove cut off from a side edge of the bus bar 17 or may be any shape as required.

(6) In the present embodiment, of the pair of connection portions, the voltage detection terminal 25 is connected to one of the connection portions. However, configurations are not limited to the above. The voltage detection terminal 25 may be connected to both of the connection portions. Alternatively, the voltage detection terminal 25 may be eliminated.

(7) In the present embodiment, the positive electrode 11 and the negative electrode 12 are provided on the upper surface of the electric cell 14. However, configurations are not limited to the above. The positive electrode 11 and the negative electrode 12 may be respectively provided on the upper and lower surfaces of the electric cell 14.

(8) The number of the electric cells 14 included in the battery module 10 is not limited to those disclosed in the embodiments. Any number of the electric cells 14 may be provided, if two or more, on the battery module 10.

REFERENCE SIGNS LIST

10: Battery module
11: Positive electrode
12: Negative electrode
13: Electrode terminal
14: Electric cell
15: Wiring module
16A: Through-hole (connection portion)
17: Bus bar
18: Bus bar insulating member
19: Recess
21: Placement portion
22: Insulating wall
23: Projection
24: Engagement tab
25: Voltage detection terminal
30: Holder
33: Auxiliary insulating member
40: Engagement portion
50: Guide
51: Guide receiver

The invention claimed is:

1. A wiring module attached to a plurality of electric cells having electrode terminals including positive electrodes and negative electrodes, the wiring module comprising:
   a plurality of bus bars having pairs of connection portions respectively connected to the positive electrodes and the negative electrodes of the electric cells; and
   bus bar insulating members, each of which is held between side edges of the bus bars that are adjacent to either side of each of the bus bar insulating members, wherein
   the bus bar insulating members comprise a first bus bar insulating member and a second bus bar insulating member connected with each other by one of the bus bars, wherein
   at least one of the first bus bar insulating member and the second bus bar insulating member has a housing portion that houses at least a first portion of an adjacent one of the bus bars, and wherein
   one of the first bus bar insulating member and the second bus bar insulating member is movable relative to the adjacent one of the bus bars in a direction in which the bus bars are arranged.

2. The wiring module according to claim 1, wherein one of the pair of connection portions is connected to a voltage detection terminal detecting a voltage of the electric cell.

3. The wiring module according to claim 1, wherein the first bus bar insulating member is fixed to the adjacent one of the bus bars and and the second bus bar insulating member is movably with respect to the adjacent one of the bus bars.

4. The wiring module according claim 1, wherein the bus bar insulating member is held by the bus bar with a clearance provided between a projection of the bus bar insulating member and a side end of a recess, of the adjacent one of the bus bars, in which the projection is positioned.

5. The wiring module according claim 1, wherein the bus bar insulating member comprises:
   a placement portion on which the bus bar is placed; and
   an engagement tab holding and locking the bus bar in a thickness direction of the bus bar.

6. The wiring module according to claim 5, wherein a clearance in the thickness direction of the bus bar is provided between the bus bar placed on the placement portion and one of the placement portion and the engagement tab.

7. The wiring module according to claim 5, wherein the bus bar insulating member has a plurality of engagement tabs aligned in a direction in which the bus bar insulating members are connected.

8. The wiring module according to claim 1, wherein either
   a recess in a surface of the bus bar is engaged with a projection in the bus bar insulating member; or
   a projection in the surface of the bus bar is engaged with a recess in the bus bar insulating member.

9. The wiring module according to claim 8, wherein the recess and the projection are engaged with a clearance therebetween.

10. The wiring module according to claim 8, wherein either
the recess in the bus bar spans a portion where the first bus bar insulating member and the second bus bar insulating member are connected, and the projection is provided, in a portion opposite to the recess, in the first bus bar insulating member and the second bus bar insulating member; or the projection in the bus bar spans a portion where the first bus bar insulating member and the second bus bar insulating member are connected, and the recess is provided, in a portion opposite to the projection, in the first bus bar insulating member and the second bus bar insulating member.

11. The wiring module according to claim 10, wherein engagement between the recess and the projection prevents disengagement of the bus bar and the first bus bar insulating member and disengagement of the bus bar and the second bus bar insulating member.

12. The wiring module according to claim 1, wherein the connection portions are provided passing through the bus bar and are through-holes into which the positive electrode and the negative electrode are respectively inserted.

13. The wiring module according to claim 12, wherein at least one of the pair of connection portions is an elongated hole having a long diameter in the direction in which the bus bar insulating members are connected.

14. The wiring module according to claim 1, wherein the bus bar insulating member has an insulating wall separating the adjacent bus bars.

15. The wiring module according to claim 1, wherein the first bus bar insulating member has a guide extending toward the second bus bar insulating member and the second bus bar insulating member has a guide receiver receiving the guide.

16. The wiring module according to claim 1, wherein one of the bus bars positioned in an end portion has an auxiliary insulating member comprising a synthetic resin on an end portion opposite to an end portion where the bus bar insulating member is held.

17. The wiring module according to claim 2, wherein one of the bus bar and the voltage detection terminal has an engagement portion engaging with the other.

18. The wiring module according to claim 2, wherein the bus bar insulating member has a holder holding the voltage detection terminal.

* * * * *